Feb. 21, 1928.
J. WHALEN
RACE TRACK BARRIER
Filed Feb. 12, 1927
1,659,713
3 Sheets-Sheet 1
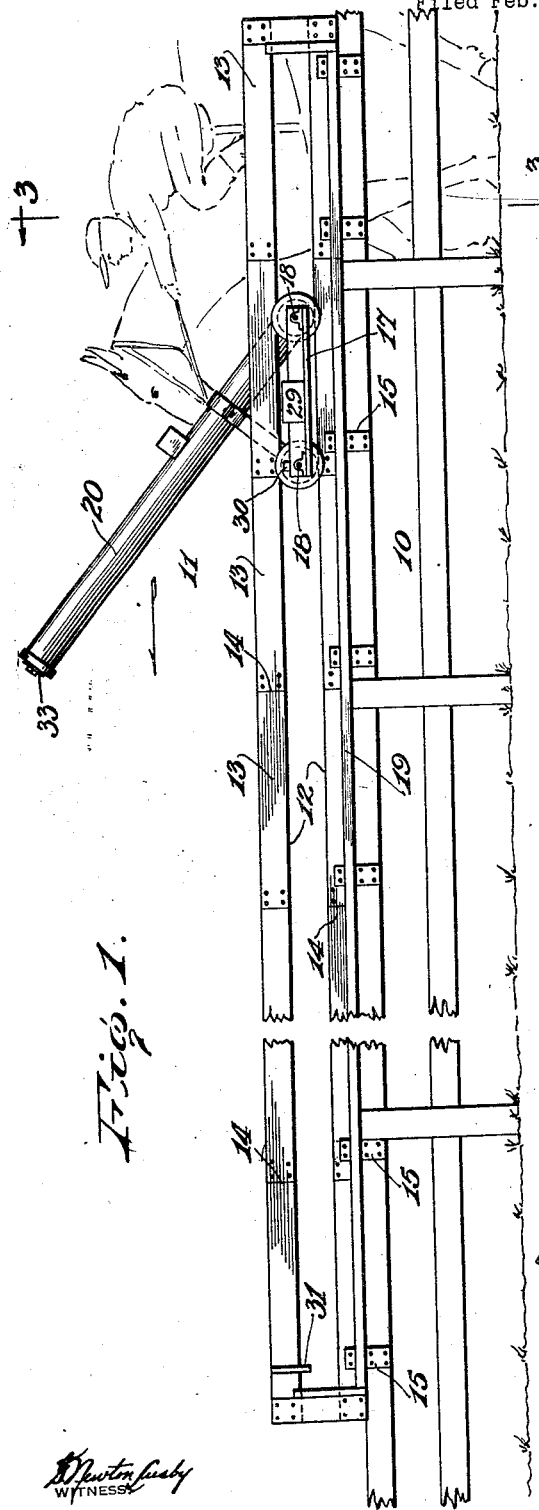
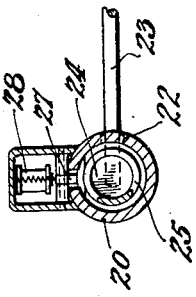
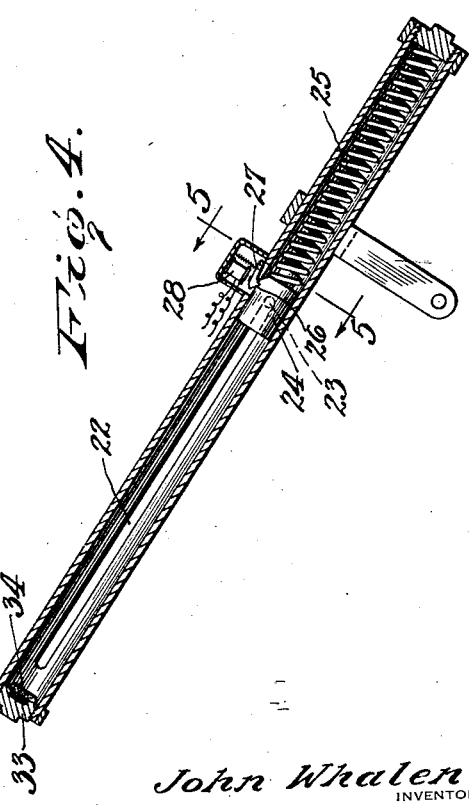
John Whalen
INVENTOR
BY Victor J. Evans
ATTORNEY

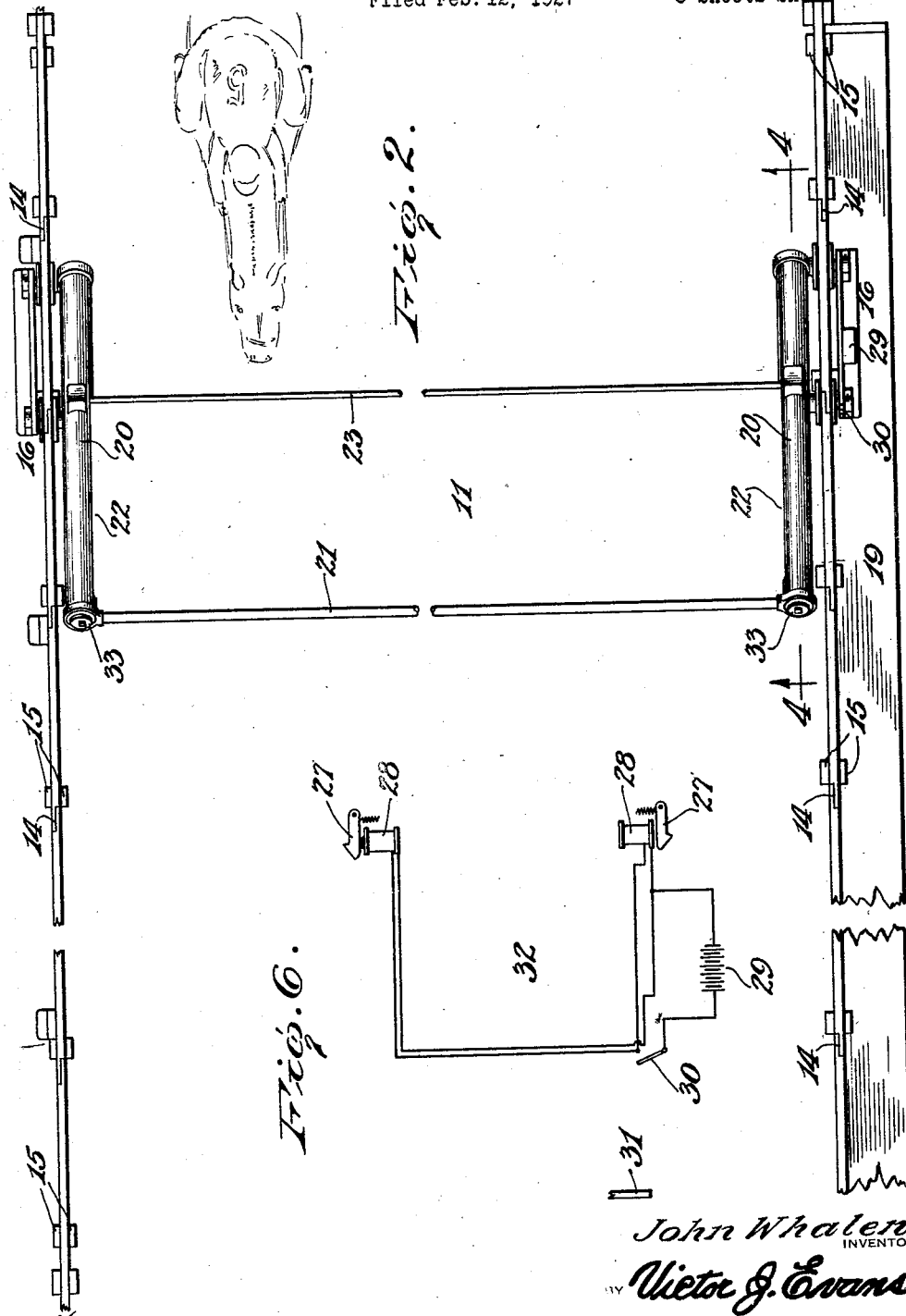

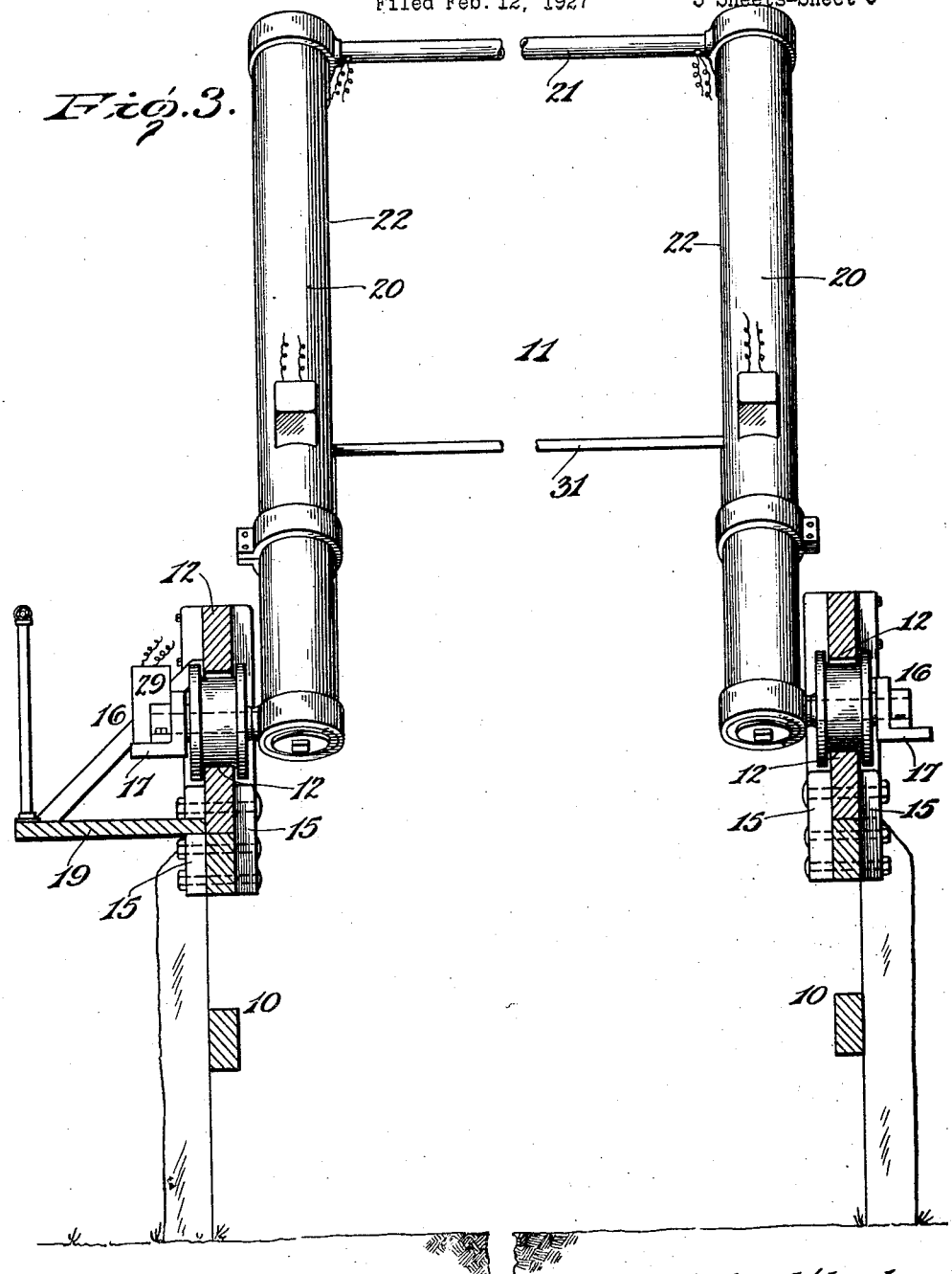

Patented Feb. 21, 1928.

1,659,713

UNITED STATES PATENT OFFICE.

JOHN WHALEN, OF JAMAICA, NEW YORK.

RACE-TRACK BARRIER.

Application filed February 12, 1927. Serial No. 167,786.

This invention relates to improvements in race track barriers.

The primary object of the invention resides in a barrier which is movable for a predetermined distance along a race course to permit the horses or participants of the race to "get-off" from a walking or standing start, but which holds them in restraint until the barrier is lifted. This type of barrier assures a fair race for all participating therein, as it will be appreciated that horses can begin running from a walking start more easily than from a stand-still. Under these conditions, all the horses in the race have an equal chance of winning which is not so in the starting of a race from a stand-still, as it is well-known that certain horses have the advantage over others due to their ability to start quicker.

Another object of the invention is to provide a movable barrier which is automatically lifted after the same has moved to a predetermined distance along the race course.

A further object of the invention is to provide a movable barrier which may be mounted upon the fence of a race course at the starting point and which is portable to facilitate shipment from one race course to another.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevation of my improved race track barrier in position upon the fence of a race course.

Figure 2 is a top plan view of the same.

Figure 3 is a vertical transverse sectional view on the line 3—3 of Figure 1.

Figure 4 is an enlarged vertical sectional view on the line 4—4 of Figure 2.

Figure 5 is a detail horizontal sectional view on the line 5—5 of Figure 4.

Figure 6 is a diagrammatic view of the wiring.

Referring more particularly to the drawing, the reference numeral 10 designates the fence of a race course on which my improved barrier 11 is removably mounted. The barrier 11 is mounted on the fence adjacent the starting point of the course and includes a pair of spaced tracks 12 of a given length, each of which tracks is composed of a plurality of rail sections 13 detachably connected together as at 14 so that the same may be taken apart for shipment. The tracks 12 are removably supported upon the fence by clamps or brackets 15.

Movably over the tracks 12 are trucks of a carriage 16, which includes a platform 17 supported by the axles of the grooved wheels 18. A platform 19 is provided beside the inner fence of the track for the starter or official in charge of moving the carriage at the beginning of a race. The carriage also supports tubular members or cylinders 20 which are disposed at approximately 45° angle and are braced by a rigid cross bar 21 so that the members move as a single unit along the tracks.

Each of the tubular members 20 is provided with a slot 22 on the inner side thereof for the passage of the ends of a barrier bar 23 which carries blocks 24 on its ends and which blocks are slidably mounted in the tubular members 20. Springs 25 act against the bottom ends of the cylinders and the blocks to normally force the same toward the top of the cylinder so that the barrier bar is moved out of the path of the horses whereby they may clear the bar when the same is lifted.

The blocks 24 are notched as at 26 for co-action by spring pressed pivoted latch members 27 controlled by electro-magnets 28. The electro-magnets 28 are arranged in series with a battery 29 or other source of energy mounted on the platform 17 and with a push button switch 30. The push button switch is also mounted on the platform 17 in the path of an arm 31 disposed adjacent the end of one of the rails so that the circuit 32 is automatically closed when the barrier 11 nears the limit of its travel in the direction of the arrow. However, should it be desired to close the circuit to release the barrier rod 23 prior to the movement of the carriage to the end of the track, the push button switch 30 may be manually operated.

The top ends of the cylinders 20 are closed by screw caps or plugs 33 having rubber cushions 34 against which the blocks 24 strike as the barrier rod reaches the limit of its upward movement whereby the cushion tends to absorb any shock between the blocks and the ends of the cylinders.

In practice, the barrier 11 is set-up upon the fence of a race track as shown in the drawings and the barrier moved to the limit of its movement toward the right. The barrier rod 23 is manually pulled down against the tension of the springs 25 until the latches 27 automatically engage the notches 26 which serves to hold the barrier rod in the path of the horses to be raced. The horses are brought to the barrier and an official takes up a position on the platform 19 from which position he pushes the barrier 11 over the tracks 12 in the direction of the arrow at which time the horses are walked at a speed not exceeding the speed of the barrier as the said barrier restrains the horses. As the carriage 16 nears the limit of its travel, the arm 31 automatically operates the push button 30 which closes the circuit 32 thereby energizing the electro-magnets 28 which release the latches 27 from the blocks 24 whereupon the springs 25 move the barrier rod 23 upwardly with great rapidity and out of the path of the horses and their riders. The horses are now free to begin running from a walking start which is a more equitable way of starting a race then from a stand-still, as certain horses have the advantage over others, but when in motion the advantages are likely to be more even.

By constructing the rails 12 of a plurality of sections, the entire structure may be taken down and shipped in a compact manner from one race course to another.

What is claimed as new is:—

1. In a device of the class described, the combination with the fence of a race course, a track removably mounted thereon, a carriage movable over said track, cylinders rising from said carriage, blocks slidable within said cylinders, a barrier rod connected to said blocks, springs acting against said blocks to normally hold said barrier rod in a raised position, means engageable with said blocks for holding said barrier rod in a lowered position against the action of said springs, and electro-magnetic means for actuating said last means to release the same to permit said springs to automatically lift said barrier rod.

2. A race track barrier comprising a track consisting of a plurality of separate rail sections, a carriage movable over said track, parallel cylinders rising from said carriage, blocks slidably mounted within said cylinders, a barrier rod connecting said blocks, springs for normally forcing said blocks toward the tops of said cylinders, latch means engageable with said blocks for holding the same in a lowered position against the tension of said springs, and automatic means for releasing said latch means upon a predetermined movement of said carriage over said track.

3. A device of the class described comprising a track, a carriage movable over said track, a movable barrier supported by said carriage, means tending to move said barrier to a raised position, means for holding said barrier in a lowered position against the action of said first means, electro-magnetic means for actuating said means to release said barrier including a switch on said carriage, and an actuating element arranged along said track in the path of said switch for engagement with the same to cause the operation of said electro-magnetic means.

In testimony whereof I have affixed my signature.

JOHN WHALEN.